United States Patent [19]

Sawazaki et al.

[11] Patent Number: 4,464,691
[45] Date of Patent: Aug. 7, 1984

[54] MAGNETIC REPRODUCING SYSTEM
[75] Inventors: Norikazu Sawazaki; Shu Chiba, both of Yokohama, Japan
[73] Assignee: Tokyo Shibaura Denki Kabushiki Kaisha, Kawasaki, Japan
[21] Appl. No.: 290,325
[22] Filed: Aug. 5, 1981
[30] Foreign Application Priority Data
  Aug. 13, 1980 [JP] Japan ................ 55-110340
[51] Int. Cl.³ ............................ G11B 5/34; G11B 5/04
[52] U.S. Cl. ............................ 360/111; 360/30
[58] Field of Search ................ 360/29, 30, 55, 111
[56] References Cited
U.S. PATENT DOCUMENTS

| | | | |
|---|---|---|---|
| 3,225,145 | 12/1965 | Warren | 360/111 |
| 3,246,219 | 4/1966 | Devol et al. | 360/111 |
| 3,423,742 | 1/1969 | Harris | 360/111 |
| 3,521,261 | 7/1970 | Metz | 360/111 |
| 4,182,987 | 8/1978 | Moeller . | |

Primary Examiner—Vincent P. Canney
Attorney, Agent, or Firm—Oblon, Fisher, Spivak, McClelland & Maier

[57] ABSTRACT

A magnetic head includes a magnetic body, at least the permeability or high frequency loss of which is changed with changes of the record magnetic field on a magnetic tape, and a coil. A high frequency signal is supplied to a tuned circuit, which includes the coil and a capacitor, and a signal corresponding to the record magnetic field is taken out through the detection of the changes of the voltage of the high frequency signal supplied to the tuned circuit.

9 Claims, 17 Drawing Figures

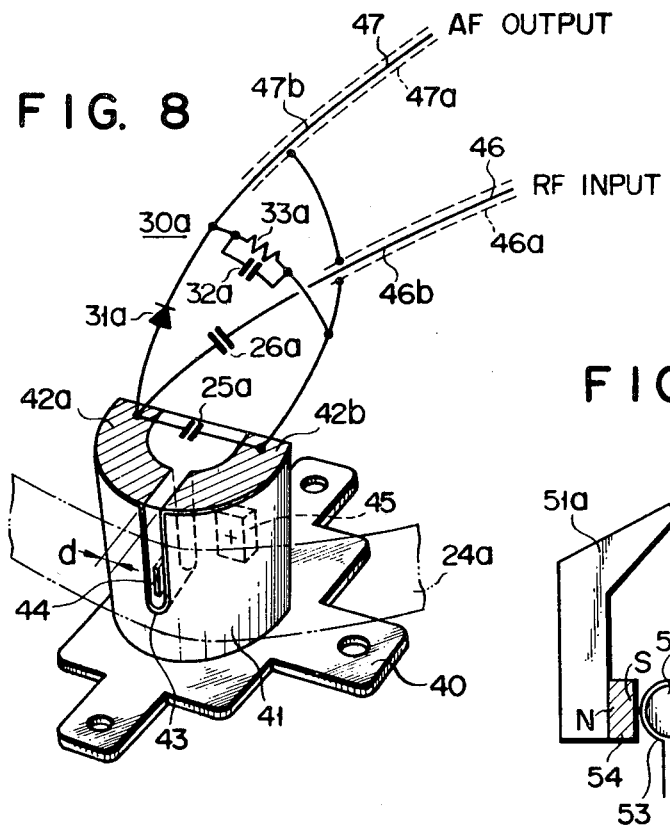
FIG. 8
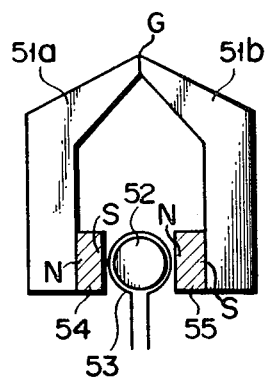
FIG. 11
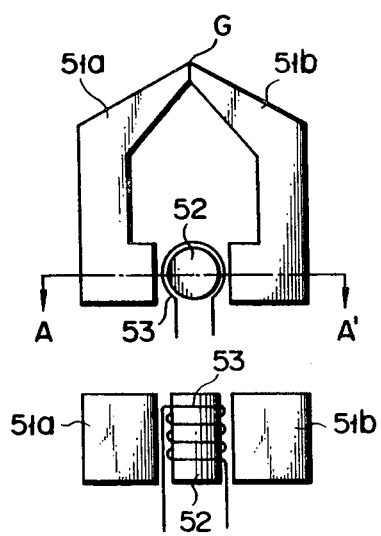
FIG. 10A
FIG. 10B

MAGNETIC REPRODUCING SYSTEM

BACKGROUND OF THE INVENTION

This invention relates to magnetic reproducing systems, in which a magnetic head is moved relative to and along a magnetic recording track formed in a magnetic recording medium for obtaining a reproduced signal.

In the prior art magnetic reproducing system, the magnetic recording tape is arranged such that its magnetic coating layer 2 formed on a base 1 is moved past the front of a ring type magnetic head 3 as shown in FIG. 1. The magnetic head 3 has a coil 4 wound on its core, and as the magnetic tape is run past the front of the head 3, a voltage is induced as a reproduced signal across the coil 4 in accordance with the changes of the magnetic field formed in the magnetic layer 2. With the prior art reproducing system of this kind, sufficiently great magnetic flux is required for obtaining sufficient reproduced output with a satisfactory signal-to-noise ratio. Therefore, it has been necessary to make the width of the recording track formed on the magnetic tape to be greater than a predetermined value. FIG. 2 is a graph showing the relation between the signal-to-noise ratio of the reproduced output and the track width W in the prior art reproducing system. As is seen from the Figure, where the track width is above 50 microns, the relation of the signal-to-noise ratio to the track width is 3 dB/octave, that is, with the doubling of the track width, for instance from 100 microns to 200 microns, the signal-to-noise ratio is improved by 3 dB. Where the track width is 50 microns, the reproducing amplifier noise $N_O$ and tape noise $N_T$ are substantially the same. Where the track width is less than 50 microns, the relation of the signal-to-noise ratio to the track width is 6 dB/octave, and the signal-to-noise ratio is thus suddenly reduced. In this case, the reproducing amplifier noise $N_O$ is greater than the tape noise $N_T$. The signal-to-noise ratio is related to $N_O$ and $N_T$ as $$\frac{S}{N} = \frac{S}{\sqrt{N_O^2 + N_T^2}} \quad (1)$$

In order to increase the reproduced output without increasing the track width W in the above prior art reproducing system of FIG. 1, it has been proposed to increase the number of turns of the coil 4 of the head 3. This method, however, leads to increase of the impedance of the reproducing head as well. This impedance and the reproducing amplifier noise $N_O$ are proportional to each other, and therefore signal-to-noise ratio is not improved so much by the aforementioned method. At present, the optimum combination of the values of the track width W and signal-to-noise ratio available is only 20 microns and 43 dB in spite of the demand for narrower track widths in the video tape recorders and magnetic discs in order to obtain long period recording and reproduction. With the prior art reproducing system, therefore, reproduced output of a signal-to-noise ratio of about 43 dB could not have been obtained with a track width of less than 20 microns.

SUMMARY OF THE INVENTION

An object of the invention is to provide a magnetic reproducing system, with which reproduced output of a satisfactory signal-to-noise ratio can be obtained even with a reduced track width, this permitting high density recording and reproduction.

According to one aspect of the invention, this object is attained by constructing a magnetic reproducing system, in which a tuned circuit is constructed with the magnetic head as a tuning element so as to take out the changes of the tuning frequency with changing permeability of the magnetic material of the magnetic head that results from the changes of the magnetic field from the magnetic recording medium when an oscillator output is supplied to the tuned circuit, and/or changes of the quality of sharpness Q of the tuned circuit with changes of the magnetic field, as the output voltage thereof. With this construction, great voltage changes can be obtained even with very small changes of the magnetic field from the magnetic recording medium, and reproduced output of a very satisfactory signal-to-noise ratio can be obtained even with a narrow track width, for instance of 20 microns, thus permitting high density recording and reproduction.

BRIEF DESCRIPTION OF THE DRAWINGS

FIG. 8 is a perspective view showing an essential part of a different embodiment of the invention; and FIGS. 9, 10A, 10B and 11 are schematic views of different examples of the magnetic head used in the system of the invention.

DETAILED DESCRIPTION OF THE PREFERRED EMBODIMENTS

Figure 3:
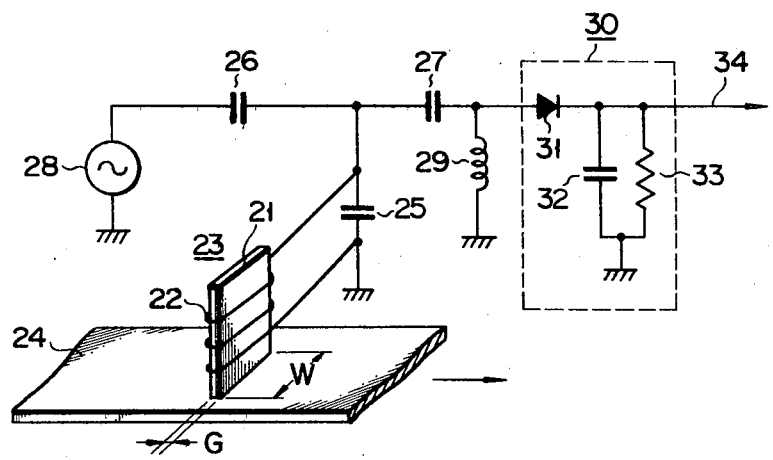
FIG. 3 is a schematic representation illustrating the principles of a magnetic reproducing system according to the invention.

FIG. 3 shows an embodiment of the invention, in which a magnetic head 23 is constituted by a plate-like magnetic body 21 and a coil 22 wound thereon. The magnetic body 21 has a width corresponding to an air gap G and a width corresponding to a recording track width W. The dimensions G and W are respectively set to 1 micron and 20 microns. The magnetic body 21 is disposed such that its gap G extends along the direction of running of the magnetic tape 24. A capacitor 25 is connected between the terminals of the coil 22. Of these junctures, one is grounded, while the other is connected to the juncture between capacitors 26 and 27. The other end of the capacitor 26 is connected to one output end of a high frequency oscillator 28, the other end of which is grounded. As examples of the circuit parameters, the capacitance of the capacitor 25 is set to 200 pF, the capacitance of the capacitors 26 and 27 to 10 pF, the output frequency of the high frequency oscillator 28 to 100 MHz, and the output voltage to one volt. The capacitance of the capacitors 25 and 27 is set to a small value in order that the high frequency oscillator 28 can be regarded to be a current source, that the direct current is cut off and that there is no adverse effect upon the operation of the tuned circuit constituted by the magnetic head 23 and capacitor 25.

The other end of the direct current cut-off capacitor 27 is grounded through an RF choke 29 and is also connected to the anode of a diode 31 in a peak detecting circuit 30. The cathode of the diode 31 is grounded through a parallel circuit of a capacitor 32 and a resistor 33, and is also connected through an output terminal 34 to an input terminal of a reproducing amplifier (not shown).

Figure 4:
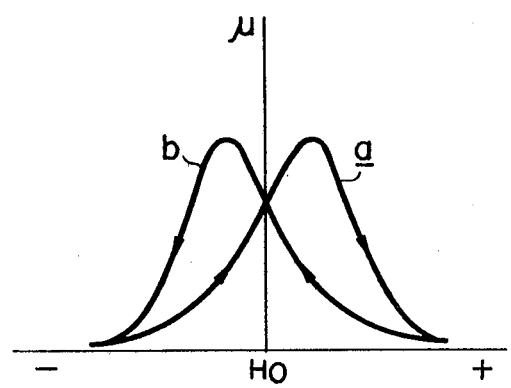
FIG. 4 is a graph showing changes of the permeability $\mu$ of magnetic material with changes of the magnetic field.
Figure 5A:
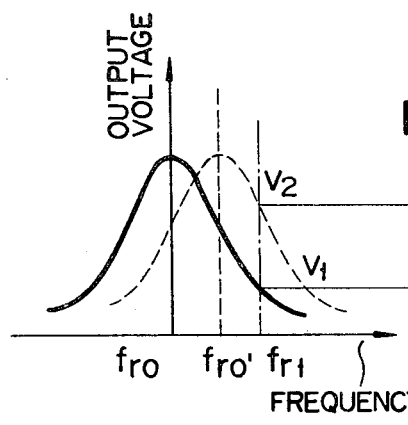
FIG. 5A is a graph showing the terminal voltage of a tuned circuit changing with the tuning frequency.
Figures 5B, 5C:
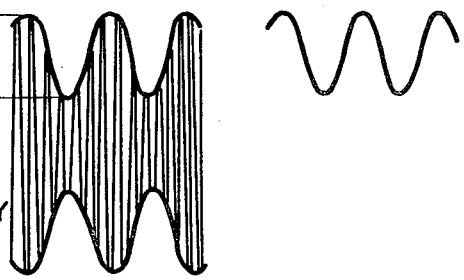
FIG. 5B is a graph showing the waveform of an oscillator output signal amplitude modulated as a result of a change of the tuning frequency due to a change of the recording magnetic field.
FIG. 5C is a waveform diagram showing an output obtained as a result of the peak detection of the high frequency signal shown in FIG. 5B.

With the magnetic reproducing system of the above construction, as a magnetic tape 24, on which a signal is recorded, is run past the magnetic head 23, a magnetic field that changes according to the recorded signal is applied to the magnetic head 23, whereby the permeability $\mu$ of the magnetic body 21 is changed in the manner as shown in FIG. 4; when the magnetic body 21 is magnetized in one direction by a recording magnetic field applied to the magnetic tape 24, the permeability $\mu$ is changed as shown by arrow in the curve a, while when the body is magnetized in the opposite direction it is changed as shown by arrow in the curve b. The magnetic body 21 is suitably made of a material subject to great changes of $\mu$. Examples of the material are thin film Permalloy, Sendust, Mn-Zn ferrite, etc. As Mn-Zn ferrite a single crystal may be used, or what is obtained by solidifying its powder by baking with a hot press may be used. With great changes of the permeability $\mu$, the inductance of the coil 22 is greatly changed to change of the tuning frequency of the tuned circuit constituted by the capacitor 25 and coil 22. Thus, if the tuning frequency of the initial state of the tuned circuit is set to, for instance, the center frequency $f_{r0}$ of the output voltage versus frequency characteristic as shown by the solid curve in FIG. 5A, with a change of the inductance of the coil 22 the tuning frequency is changed to, for instance, $f_{r0}'$, the center frequency of the characteristic shown by the dashed curve in FIG. 5A. The initial tuning frequency $f_{r0}$ is set to what is obtained when the magnetic head 23 is in contact with magnetic tape 24 which is free from any signal recorded. Thus, if the frequency of the high frequency signal supplied from the high frequency oscillator 28 to the tuning circuit that is constituted by the coil 22 and capacitor 25, is set to $f_{r1}$ as shown in FIG. 5A, the voltage generated across the tuned circuit is changed from $v_1$ to $v_2$. Consequently, the signal supplied from the high frequency oscillator 28 to the peak detector 30 is amplitude modulated by the signal recorded on the magnetic tape 24, as shown in FIG. 5B. This modulation of the high frequency signal is supplied to the peak detector 30 for detection there, whereby a detected output as shown in FIG. 5C, i.e., the reproduced signal output, can be obtained.

Figure 1:
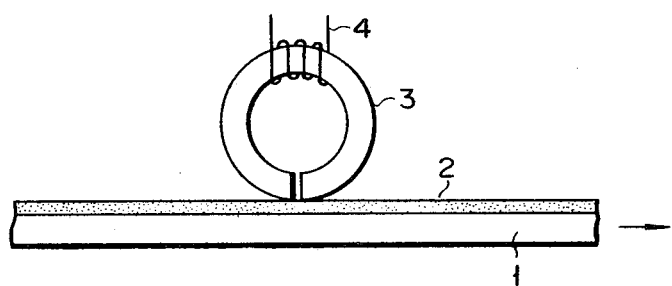
FIG. 1 is a schematic view showing a prior art magnetic reproducing system.
Figure 2:
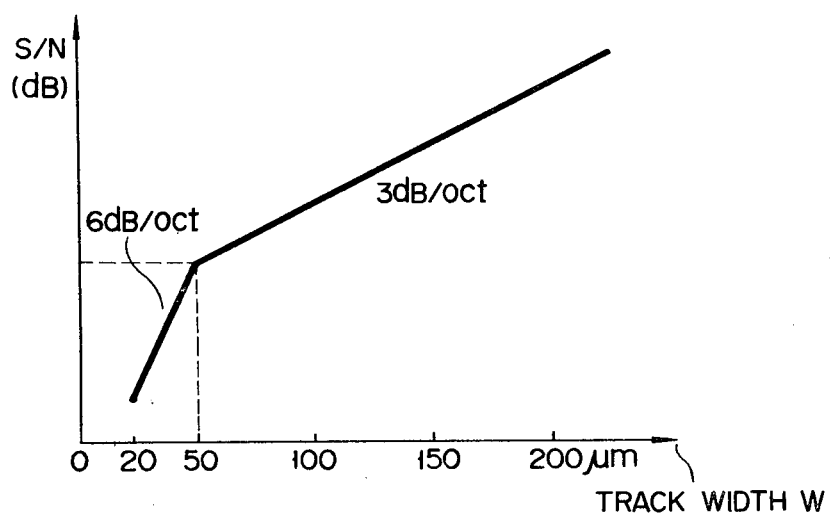
FIG. 2 is a graph showing the relation between the signal-to-noise ratio of reproduced output and track width in a prior art reproducing system.

It is to be appreciated that according to the invention, unlike the prior art reproducing system using a ring type reproducing head as shown in FIG. 1, a high frequency signal supplied from an oscillator is modulated according to changes of the magnitude and direction of the recording magnetic field on the magnetic tape, so that the reproduced output energy can be supplied from the oscillator and also it is possible to obtain an output which is responsible to even very small changes of the recording magnetic field, thus permitting a reproduced output signal of a satisfactory signal-to-noise ratio to be obtained. Thus, it is possible to reduce the width of the recording track formed on the magnetic recording medium to a small value, for instance less than 20 microns, and thus obtain high density recording.

Figure 6A:
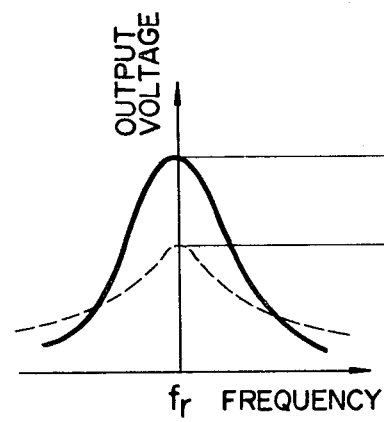
FIG. 6A is a graph showing the terminal voltage of tuned circuit changing with the Q of the tuned circuit.
Figures 6B, 6C:
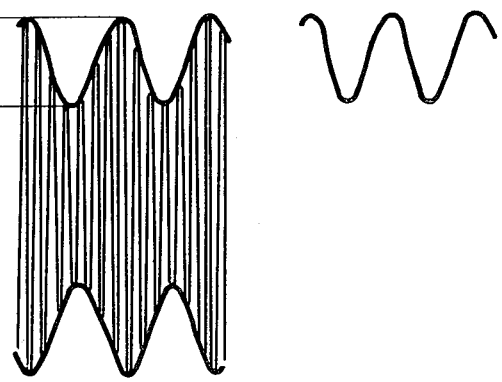
FIG. 6B is a graph showing the waveform of an oscillator output signal amplitude modulated as a result of a change of the Q of the tuned circuit due to a change of the recording magnetic field.
FIG. 6C is a waveform diagram showing an output obtained as a result of the peak detection of the high frequency signal shown in FIG. 6B.

While the description so far has concerned with the case of reproducing signal by making use of the changes of the tuning frequency with changes of the permeability $\mu$ of the magnetic body 21, it is also possible to obtain reproduction of signal by making use of the sharpness Q of the tuning circuit with changes of the high frequency loss in the magnetic body 21 of the reproducing head 23 with the same construction as described above. The magnetic body 21 of the magnetic head 23 is preferably a material, with which the high frequency loss changes greatly with changes of the magnetic field, for instance microwave ferrite and high frequency ferrite. Examples of the microwave ferrite is Mn-Mg ferrites, Ni ferrites, Ni-Al ferrites, YIG ferrites and Al substituted YIG ferrites. When the recording magnetic field on the magnetic tape is changed, the magnetic body 21 is correspondingly magnetized to change the Q according to the change of the magnetization. With the change of the Q the terminal voltage across the tuned circuit, which is constituted by the coil 22 and capacitor 25, and the tuning frequency of which is set to $f_r$, is changed between the solid curve and dashed curve in FIG. 6A. Thus, the high frequency oscillation output supplied from the high frequency oscillator 28 to the peak detector 30 is amplitude modulated according to the changes of the Q of the tuned circuit as shown in FIG. 6B, and through the detection of the modulation of signal in the detector 30 a peak detection output as shown in FIG. 6C is obtained.

While it is possible to utilize only one of the aforedescribed two reproducing systems, namely one making use of the changes of the tuning frequency with changes of the permeability $\mu$ of the magnetic body of the reproducing head and one making use of the Q of the changes of the tuned circuit due to the high frequency loss in the magnetic body, actually the changes of the permeability $\mu$ and the changes of the high frequency loss can take place at the same time in the magnetic body, and thus it is possible to construct the reproducing system which makes use of these two different changes in combination.

While the changes of the permeability $\mu$ and the changes of the high frequency loss both occur in low magnetic field, it is also possible to obtain the modulation of high frequency signal in a tuned circuit which makes use of a phenomenon of resonant absorption of microwaves in high magnetic field.

Figure 7:
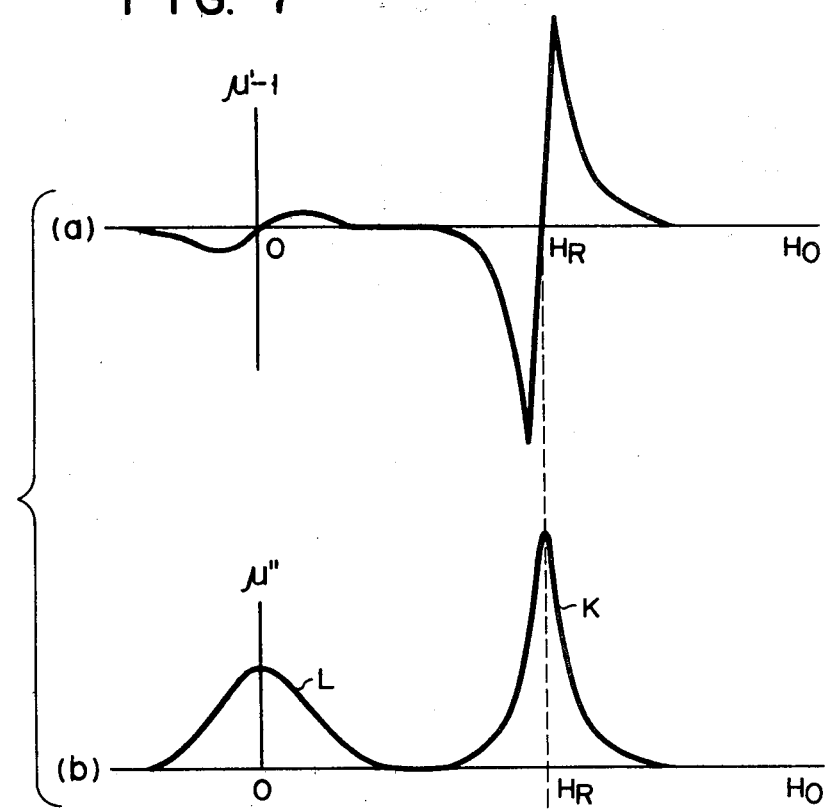
FIGS. 7(a) and 7(b) are graphs respectively showing the relations of the tensor permeability $\mu'$ of the magnetic material of the magnetic head and the microwave loss $\mu''$ to the magnitude of the magnetic field.

FIGS. 7(a) and 7(b) show how the tensor permeability $\mu'$ and the loss term $\mu''$ thereof for a microwave at a certain frequency change with the external magnetic field. In the Figures, the positive direction of the external magnetic field is set as a direction, in which the axis of rotation of the precession of the magnetization vector of the magnetic body of the magnetic head and the number of rotations of the axis respectively coincide with the direction of the circular polarization of the microwave and the number of rotations, i.e., in a direction in which the resonance occurs.

It will be seen from FIGS. 7(a) and 7(b) that the magnetic body generally has a characteristic L, in which the permeability $\mu$, tensor permeability $\mu'$ and loss $\mu''$ change in low magnetic field and a characteristic K, in which the phenomenon of resonant absorption occurs in high magnetic field to cause changes of the tensor permeability $\mu'$ and resonant loss $\mu''$. Thus, by using this characteristic K the same reproduction result as described previously can be obtained with the construction of FIG. 3. In this case, however, it is necessary to preliminarily apply a bias field to the magnetic body 21. As the bias field, a direct current bias field may be applied with a permanent magnet or an electromagnet, or an alternating current bias field may, if necessary, be applied. In this case, denoting the frequency of the high frequency field applied to the X-Y plane along the paper of the Figure by f, the resonant field $H_R$ (in a z direction perpendicular to the plane of paper of the Figure, is expressed as $$f = \gamma \sqrt{\{H_R + (N_x - N_z)M_S\}\{H_R + (N_y - N_z)M_S\}} \quad (2)$$

where $\gamma$ is the giromagnetic ratio and usually 2.8 MHz/oersted, and $N_x$, $N_y$ and $N_z$ are demagnetizing factors when the direction of the external resonant field is z and related to one another as $N_x+N_y+N_z=4\pi M_S$, with $M_S$ being the saturation field.

Now, the case of applying an external magnetic field to the axis of a needle-like magnetic body is considered. At this time, the demagnetizing factors are $N_x=N_y=2\pi$, and $N_z=0$. Thus the equation (2) can be changed to $$f=\gamma(H_R+2\pi M_S) \quad (3)$$

This means that by suitably selecting the saturation magnetization value, the recording state can be readily maintained by holding the resonant field $H_R$ to be less than 30 to 500 oersted which is the coercive force of the magnetic tape. For example, if f=560 MHz, with a magnetic material with the saturation magnetization of 300 gauss, for instance aluminum substituted YIG (yttrium-iron-garnet) the resonant magnetic field $H_R$ is 50 oersted. Thus, if the bias field is set to the neighborhood of 50 oersted, the derivation of changes of the tensor permeability or the loss term thereof due to the resonant phenomenon can be facilitated. If the bias field is set to a value less than 50 oersted and below the coercive force not reaching the saturation state (inclusive of the nonbias magnetic field state), the derivation of the changes of the low magnetic field loss can be facilitated as described previously.

In the above embodiment of FIG. 3, in which the wire coil 22 of the magnetic head 23 is wound several turns on the plate-like magnetic body 21, the coil 22 is spaced apart a certain distance from the magnetic recording surface of the magnetic tape 24, and therefore the sensitivity of the reproduction is inevitably reduced by an amount corresponding to the distance.

FIG. 8 shows a different embodiment, which overcomes the above drawback. In FIG. 8, a magnetic head has a semi-cylindrical head base 41 with one end thereof secured to a support member 40. The head base 41 is a molding of a plastic material. A horseshoe-shaped conductive film 42 is molded on the other end of the semi-cylindrical head base 41. It is separated into conductive film divisions 42a and 42b defining a predetermined gap d therebetween. A U-shaped strip-like coil 43 is molded in an axial notch formed in the head base 41 and terminating at the open end in the aforementioned portion of the gap d. The opposite ends of the strip-like coil 43 are each connected to each of the conductive film divisions 42a and 42b. One side edge of the strip-like coil 43 is flush with the periphery of the head base 41. A magnetic body 44 having a thickness of 1 micron and a width of 20 microns, for instance, is molded in the strip-like coil 43 such that its end has substantially the same height as the coil 43. Further, a permanent magnet 45 for biasing is mounted in the molding 41 in a predetermined position thereof.

A capacitor 25a, which corresponds to the tuning capacitor 25 in the embodiment of FIG. 3, is connected between the conductive film divisions 42a and 42b, and one of its ends is connected to outer shield conductors 46a and 47a of shield wires 46 and 47. The center conductor 46b of the shield wire 46 is connected at one end to the output terminal of the high frequency oscillator 28 and at the other end through a capacitor 26a to the conductive film division 42a. The conductive film division 42a is connected to the anode of a diode 31a which is used in a peak detector 30a. The cathode of the diode 31a is grounded through a parallel circuit of a capacitor 32a and resistor 33a, and it is also connected through the center conductor 47b of the shield wire 47 to the input terminal of a reproducing amplifier (not shown).

With this construction, the magnetic tape 24a is run in frictional contact with the coil 43 and magnetic body 44 at a position shown by two-dot-and-bar lines in FIG. 8. It is to be appreciated that with this embodiment the coil 43 can be provided near the magnetic tape 24 such that it is practically in contact therewith, thus permitting improvement of the detection sensitivity compared to the previous embodiment of FIG. 3.

Figure 9:
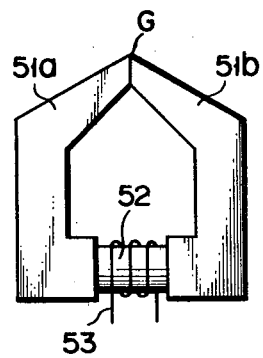

FIG. 9 shows a further example of the reproducing magnetic head used in accordance with the invention. With this head, like the prior art reproducing head, the magnetic field from the magnetic tape is reinforced by cores 51a and 51b made of such material as Permalloy or high permeability ferrite and defining a gap G, and a magnetic body 52 which makes use of the changes of the permeability $\mu$ or high frequency loss is provided to be found in the reinforced magnetic field. A coil 53 is wound on the magnetic body 52. In this case, it is of course that the magnetic body 52 need not be a thin plate as in the embodiment of FIG. 3.

FIGS. 10A and 10B show a further embodiment of the invention. This embodiment is different from the embodiment of FIG. 9 in that the high frequency magnetic field generated from the coil 53 and the magnetic field from the recording medium are applied to the magnetic body 52 in a perpendicular relation to each other. The way of applying magnetic field to the magnetic body 52 can be selected depending upon whether use is made of the changes of the permeability $\mu$ or the changes of the loss. Further, it is possible, if necessary, to provide additional bias field like the embodiment of FIG. 8.

FIG. 11 is a further example of the construction of the magnetic head, which is suitable in case when making use of the resonant absorption phenomenon. Here, permanent magnets 84 and 85 are provided such that a direct current bias magnetic field is applied to the magnetic body 52. Again in this case, the direction of the bias field has to be in a perpendicular relation to the high frequency field generated by the coil 53 as described earlier in connection with FIGS. 10A and 10B. The perpendicular relation between the bias field and high frequency field can also be provided by a microwave circuit, for instance a waveguide, a coaxial cable, a Lecher wire, or a two-conductor or three-conductor strip line. Further, the tuning circuit may be constructed without use of any inductance coil wound on the magnetic body but by using a microwave circuit as mentioned above.

As has been described in the foregoing, according to the invention it is possible to detect record magnetic field from the magnetic recording medium with a very high sensitivity, thus permitting an output of a satisfactory signal-to-noise ratio to be obtained. Thus, the recording track width can be readily reduced to to less than 20 microns, thus permitting high density recording and reproduction.

In the prior art using a ring type magnetic head the magnitude of the output extremely changes in accordance with the running speed of the magnetic recording medium. By contrast the system of this invention can provide a stable output irrespective of the change of the speed of the medium. This is because the magnitude of the output is determined by the level of the high frequency signal supplied to the tuned circuit.

What we claim is:

1. A magnetic reproducing system comprising:
a magnetic head having a magnetic body buried in a molding which serves as a head base, in such a way that it is partly exposed and is in frictional contact with a magnetic recording medium, and a strip coil buried in said molding in such a way that it is electromagnetically coupled with said magnetic body, and the edge of said strip coil on one side thereof is in the vicinity of said magnetic body; and
means for obtaining a reproduced signal across said strip coil according to changes in a record magnetic field of said magnetic recording medium, wherein said reproduced signal obtaining means has a tuned circuit including said strip coil, a pair of conductive film divisions provided on said head base and connected to opposite ends of said strip coil, and a tuning capacitor connected between said pair of conductive film divisions, means for supplying a high frequency signal to the tuned circuit and means for deriving a signal corresponding to said record magnetic field through the detection of changes in the voltage of the high frequency signal supplied to said tuned circuit.

2. The magnetic reproducing system according to claim 1, wherein said strip coil is a U-shaped strip coil buried in said molding in such a way that it surrounds said magnetic body.

3. The reproducing system according to claim 1 or 2 wherein bias magnetic field generating means is burried in said molding at a position thereof in the vicinity of said magnetic body.

4. The reproducing system according to claim 1 or 2, wherein said magnetic body is made of a magnetic material, the permeability of which changes greatly with changes in the record magnetic field, and changes in the voltage of said high frequency signal resulting from changes in the tuning frequency of the tuned circuit, due to changes of the permeability, may be detected.

5. The reproducing system according to claim 1 or 2, wherein said magnetic body is made of a magnetic material, the high frequency loss in which is greatly changed with changes in the record magnetic field, and changes in the voltage of said high frequency signal resulting from changes in the quality Q of the tuned circuit, due to the changes of the high frequency loss, may be detected.

6. A magnetic reproducing system comprising:
a magnetic head having a magnetic body with a coil wound thereon; and
means for obtaining a reproduced signal across said coil according to changes in the record magnetic field of said magnetic recording medium, wherein said means for obtaining a reproduced signal having a tuned circuit including said coil, means for supplying the high frequency signal to the tuned circuit and means for deriving a signal corresponding to said record magnetic field through the detection of the changes in the voltage of the high frequency signal supplied to said tuned circuit; and
wherein said magnetic body is made of a magnetic material, the high frequency loss of which is greatly changed with changes in the record magnetic field, and changes in the voltage of said high frequency signal resulting from changes in the quality Q of the tuned circuit, due to the changes of the high frequency loss, may be detected.

7. The reproducing system according to claim 6, wherein said magnetic body is provided in the magnetic path of a magnetic core having a gap.

8. The reproducing system according to claim 7, wherein the coil wound on said magnetic body is arranged in such a way that the high frequency magnetic field generated from the coil and the magnetic field generated from the record magnetic field are perpendicular to each other.

9. The reproducing system according to claim 7, wherein a pair of permanent magnets for biasing are provided in said magnetic path on opposite sides of said magnetic body, the magnetic field from said permanent magnets from biasing being perpendicular to the magnetic field from the recording medium.

* * * * *